March 9, 1937.  E. D. CODDINGTON  2,073,001
STUD
Filed Nov. 1, 1935
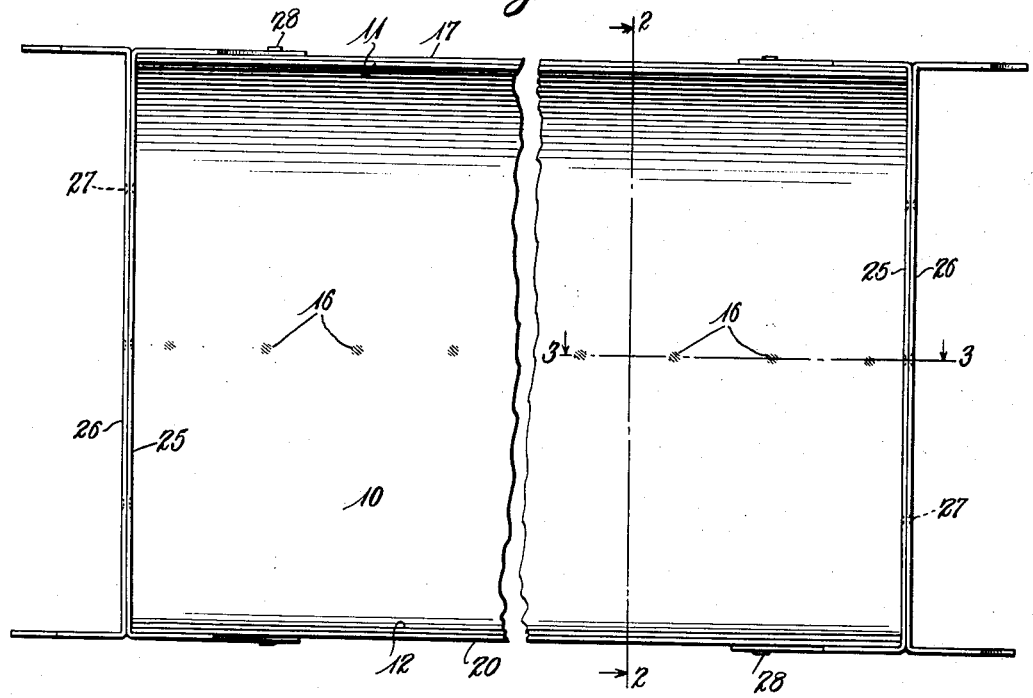
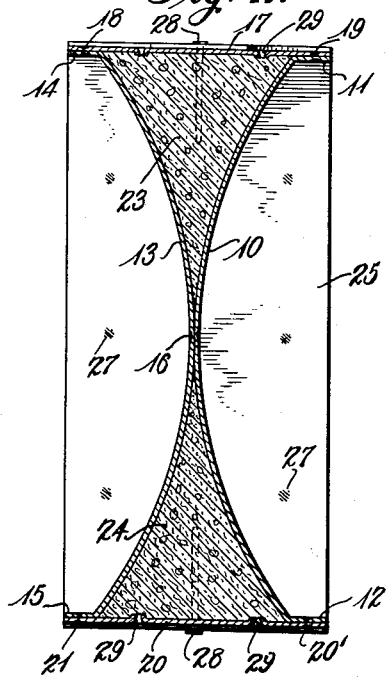
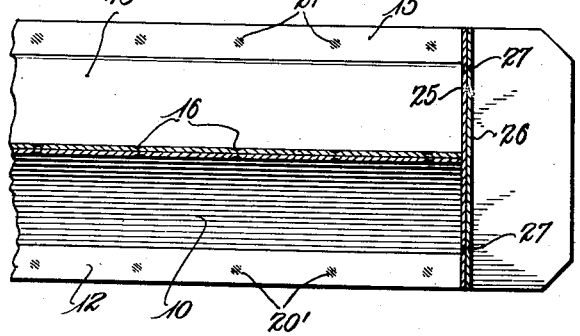
Inventor
Edwin D. Coddington
By Richard K. Stevens
Attorney Patented Mar. 9, 1937

2,073,001

UNITED STATES PATENT OFFICE 2,073,001

STUD

Edwin D. Coddington, Milwaukee, Wis., assignor to Reynolds Corporation, New York, N. Y., a corporation of Delaware Application November 1, 1935, Serial No. 47,865

2 Claims. (Cl. 72—115)

The present invention has to do with a fabricated stud of metal and nail receiving composition.

The objects of the invention include, among others, the provision of a metal and composition stud into which nails may be driven, the cost of which is relatively slight and the strength great; and an unique structure comprising combined paired arcuately shaped members and flat side members united to provide the greatest possible resistance to torsional and end to end stresses.

These objects, and such other objects as may hereinafter appear, are obtained by the novel construction, unique arrangement, and improved combination of the several elements which constitute the invention, one form of which is illustrated in the accompanying single sheet of drawing, hereby made a part of this specification, and in which:

Figure 1 is a fragmentary side view of one form of the herein described improved stud;

Figure 2 is a transverse section on the line 2—2 of Figure 1; and

Figure 3 is a longitudinal section on the line 3—3 of Figure 1.

Like reference characters are used to designate similar parts in the drawing and in the following description of the embodiment of the invention.

The herein described stud comprises but four metal parts and a cementitious fill. End members may be added. The metal parts comprise two longitudinal members arcuately formed in cross section and having outwardly directed flanges at their edges. One of said longitudinal members comprises an arcuate body 10 and the flanges 11 and 12, the flanges 11 and 12 being parallel to one another. The second longitudinal member comprises an arcuate section 13, and the flanges 14 and 15. Members 10 and 13 are identical but reversed.

Members 10 and 13 may be joined along their median lines by spot welding 16 so as to impart to the stud a generally X-shaped transverse cross-section. The two generally V-shaped spaces between the arcuate members are enclosed by the top and bottom strip cover members 17 and 20. The member 17 is joined by spot welding 19 to the flange 11 and by spot welding 18 to the flange 14. The member 20 is joined by spot welding 20' to the flange 12 and by spot welding 21 to the flange 15.

After the members 10, 13, 17 and 20 have been secured one to another, a cementitious filling material is packed into the V-shaped enclosures thus formed. Such fill is designated 23 at the top of Figure 2 and by the numeral 24 at the bottom of such figure.

The stud is closed by end members, each comprising two U-shaped members 25 and 26 of strip metal joined at their closed sides by spot welding 27. One U-shaped member is telescoped over the end of the stud. It is usual to attach an end member by first filling the stud to within a few inches of its end with cementitious material, allowing such material to dry, thereafter filling the end section with a similar or different cementitious mix, telescoping the end member thereover, and driving nails 28 through the lip of the end member and the members 17 and 20, and into the soft mix. The mix is then allowed to dry.

Studs are generally of several arbitrarily selected standard lengths. They may be readily shortened. The arcs of the members 10 and 13 are such that when the members 10 and 13 are joined one to another at their longitudinal median lines and joined at their flanges to the strips 17 and 20 they strongly resist relative movement one to the other. One reason why a stud made with the members and in the manner herein described has great strength is because the arcuate bodies of the side members resist torsional stresses far more effectively than straight sheets of the same size and weight. By backing one arcuate member against the other and attaching them, a substantially twist proof stud is obtained. The cementitious fill intermediate the arcuate members which is such as will receive nails driven thereinto provides a body to prevent any ill effect from compression stresses and further reenforces the arcuate members against a torsional stress in substantially preventing relative movement between the opposed walls of the arcuate members.

The cementitious filling material may be composed of a mixture of gypsum, Portland cement and sawdust in approximately the proportion, by weight, 55:20:9, this filler preferably being packed within the sheet metal casing in a dry state and afterwards wetted by introduction of water through perforations 29 formed through the casing. Upon hardening this filling material forms a core into which nails may be driven without cracking or crumbling and by which the nails are tenaciously held. This mode of fabricating structural members is more particularly described and claimed in my copending application Serial No. 39,022, filed September 3, 1935.

A stud as described will not collapse from end to end because of the internal strength of the opposed arcuate members thereof to any bend angular to their longitudinal dimension. The structure of the stud therefore is one of great strength and one which will resist wind pressure when used in building structures.

The studs are used in the same manner as wood studs. The end members provide means for readily attaching studs one to another or to other types of studding or to beams. Sheathing, plaster bases and other wall materials are readily secured by nailing. The stud is as efficient as a wooden stud, of about the same weight, and is resistant to fire, decay and the action of destructive insects.

I claim:

1. A stud comprising a pair of arcuate relatively thin sheet metal members disposed in reverse, back-to-back relation so as to impart to the stud a centrally constricted transverse cross-section, each of said arcuate members having outwardly projecting terminal flanges, top and bottom cover members of relatively thin, nail-penetrable sheet metal overlying and extending between corresponding flanges of the arcuate members and rigidly secured thereto to prevent longitudinal slippage, and a core of cementitious nailable material confined between the arcuate members and the top and bottom cover members whereby nails may be driven through the cover members into the cementitious core and securely retained therein.

2. A stud comprising a pair of arcuate sheet metal members disposed in back-to-back relation and welded along their longitudinal line of contact so as to impart a generally X-shaped transverse cross-section to the stud, each of said arcuate members having outwardly projecting terminal flanges, top and bottom cover members overlying and extending between corresponding flanges of the arcuate members, said cover members being of relatively thin, nail-penetrable sheet metal having their edges terminating with the edges of the flanges and secured thereto by spot welding, and a core of cementitious nailable material confined between the arcuate members and the top and bottom cover members whereby nails may be driven through the cover members into the cementitious core and securely retained therein.

EDWIN D. CODDINGTON.